United States Patent [19]

Abdelrahman et al.

[11] 4,371,861
[45] Feb. 1, 1983

[54] NI-FE THIN-FILM TEMPERATURE SENSOR

[75] Inventors: Mona Abdelrahman, Minnetonka; Ralph W. Fuchs, Cold Spring; James O. Holman, Minnetonka; Robert G. Johnson, Minnetonka; M. Walter Scott, Minnetonka, all of Minn.

[73] Assignee: Honeywell Inc., Minneapolis, Minn.

[21] Appl. No.: 215,216

[22] Filed: Dec. 11, 1980

[51] Int. Cl.³ .............................................. H01C 3/04
[52] U.S. Cl. .................................... 338/25; 338/308
[58] Field of Search ........................ 338/25, 307–309; 29/612; 427/102, 103, 124, 126

[56] References Cited

U.S. PATENT DOCUMENTS

| | | | |
|---|---|---|---|
| 3,621,567 | 11/1971 | Hasegawa et al. | 338/308 X |
| 4,081,315 | 3/1978 | Templon | 338/308 X |
| 4,135,179 | 1/1979 | Snyder | 338/25 X |
| 4,288,776 | 9/1981 | Holmes | 338/308 |

Primary Examiner—C. L. Albritton
Attorney, Agent, or Firm—Omund R. Dahle

[57] ABSTRACT

A permalloy thin film temperature sensing element in which the NiFe film material is deposited on a substrate in very narrow lines less than about 15 μm wide and in film thicknesses in excess of about 400A° preferably in the range of 1600°–3200A°.

12 Claims, 5 Drawing Figures

NI-FE THIN-FILM TEMPERATURE SENSOR

BACKGROUND AND SUMMARY OF THE INVENTION

This invention is directed to thin film temperature sensing elements. The use of permalloy, 80%Ni-20%Fe, in magnetic sensing circuits such as in logic elements and in computer memory networks is well known. This invention is directed instead to a thin-film temperature sensor element fabricated by silicon technology and compatible with both hybrid and on-chip electronics. The film material is the normally highly magnetic permalloy material, 80%Ni-20%Fe, deposited by sputtering onto a substrate, normally a silicon chip. The 80-20 Ni/Fe ratio is chosen to minimize magnetostrictive effects in the film, but variations around this ratio will not substantially effect the sensor performance. The use of the film as a temperature sensor depends on the large favorable temperature coefficient of resistance of the NiFe alloy. The alloy also exhibits a magnetoresistive effect, that is, a resistive element can change its resistance when subjectd to a changing magnetic field. Therefore the possibility of an error in the temperature measurement exists, in general, if the temperature sensor is subjected to a magnetic field change. In nearly all practical applications, the exposure to magnetic fields will not exceed 50 oersted and it is desirable to provide a temperature sensor that will have little or no response to magnetic field of this magnitude or larger. It has been discovered that if the NiFe film material is deposited in very narrow (less than about 15 μm wide) lines and in film thickness in excess of about 400 A°, temperature sensing elements are formed that can be substantially free of magnetic field effects up to and greater than the 50 oersted field strength.

DESCRIPTION

Figure 1:
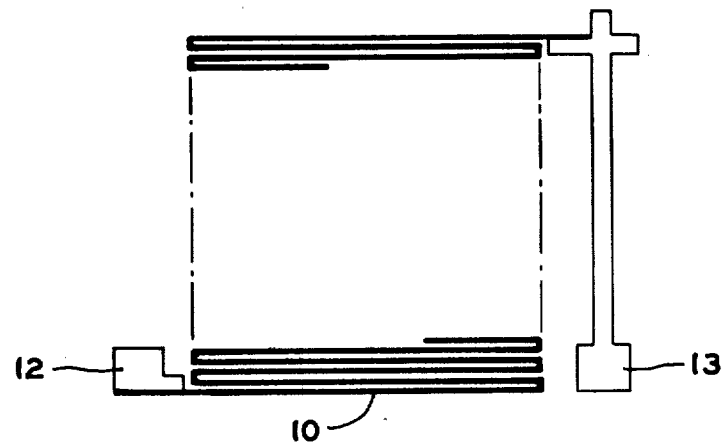
FIG. 1 is a top plan view of a permalloy temperature sensor on an integrated circuit chip.
Figure 2:
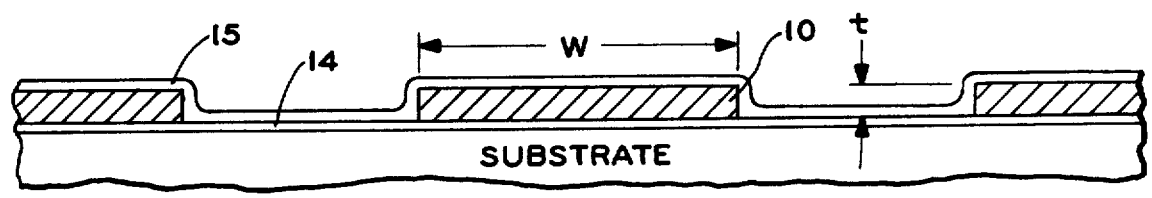
FIG. 2 is a cross sectional view of a portion of FIG. 1.

Referring now to FIG. 1, there are shown the details of the permalloy temperature sensor layout on a substrate chip. An elongated resistive conductor 10 of Ni-Fe is deposited in a serpentine or convoluted pattern on a substrate 11 of silicon, the opposite ends of resistive element terminating at pads 12 and 13. In FIG. 1 only a portion of the serpentine pattern is detailed for drafting simplification purposes, however, in one of the embodiments made according to the configuration of the drawing there are 41 adjacent horizontal convolutions in the total length of the sensor element. The serpentine pattern has a cross section shown in FIG. 2, with the run of the sensor element 10 having a width (w) in microns (μm) and a thickness (t) in angstroms (A°). The long length-to-width ratio of the sections of the run causes spontaneous magnetization parallel to the length of the run. An isolating layer 14 of silicon oxide or silicon nitride overlies the surface of the silicon substrate on which the temperature sensing element 10 is deposited, and a passivating layer of silicon nitride 15 overlays the sensing element.

In general, magnetic fields can change the resistivity of nickel-iron alloys. This effect might occur in the sensor element of this invention because an external magnetic field perpenicular to the runs tends to rotate the magnetization away from the original direction parallel to the current flow, and consequently causes a resistance change in the element. In the specific thin film embodiment taught herein, however, it becomes possible to minimize or substantially eliminate magnetic effects up to moderate field intensities. It has been discovered that for narrow line width and larger deposition thicknesses, the magnetic vector in the metal tends to become locked into the lengthwise direction of the line element, and remains essentially parallel to the current flow even in the presence of undesirable magnetic fields. That is, any slight rotation of the magnetization is opposed by the resulting induced magnetic poles on the sides of the run. The opposition is the strongest when the area of the vertical sides of the runs is large, and when the induced poles are closest together. Consequently the change in resistance due to an external field is minimized when width is small and the thickness is large. The figures to be described below show the effect (minimizing magnetic effects on Res.) of varying the dimensions of width (w) from 15μ down to 7μ0 and the thickness (t) dimensions from 400 A° up to 3200 A°.

Making (t) large also increases the maximum achievable temperature coefficient of resistance (TCR) of the element because the electron mean free path which determines resistance depends not only on crystal lattice scattering by phones (the desirable temperature dependent part), but also on film surface scattering and grain boundary scattering (undesirable non-temperature dependent contributions). Increasing (t) therefore makes the probability of non-temperature dependent scattering much less because the ultimate grain size is larger and because the proportion of electron scattering at film surfaces is less.

Figure 3:
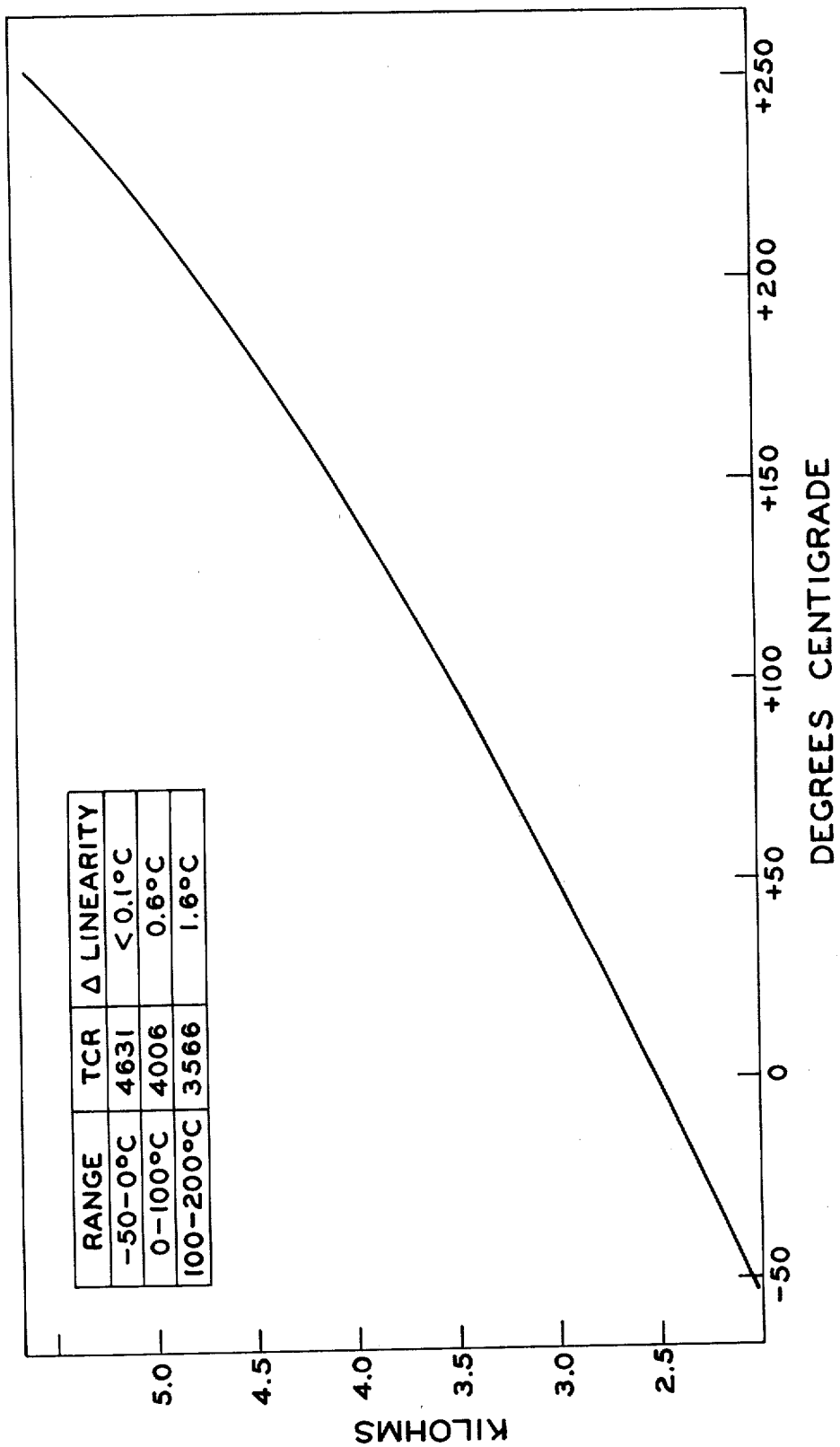
FIG. 3 is a graphical representation of resistance vs. temperature for a sensor according to the invention.

In considering the TCR (temperature coefficient of resistance) of the permalloy temperature sensors, a number of the prepared elements on silicon chips were measured under precisely controlled conditions. Among the sensors measured were those with thickness (t) of 3200 A°, 1600 A°, 800 A° and 400 A°. We have found that NiFe reaches its maximum TCR when film thickness reaches 1600 A°. FIG. 3 is representative of a plot of resistance vs. temperature measurements over a broad temperature range from −50° C. to 250° C. for 1600 A° deposition thickness of the NiFe conductor 10. The measured values for a 3200 A° thickness sensor are the same as those for 1600 A° thickness so that the curves super impose in FIG. 3 is both were plotted. The table in FIG. 3 shows the TCR in different parts of the temperature range.

Figure 4:
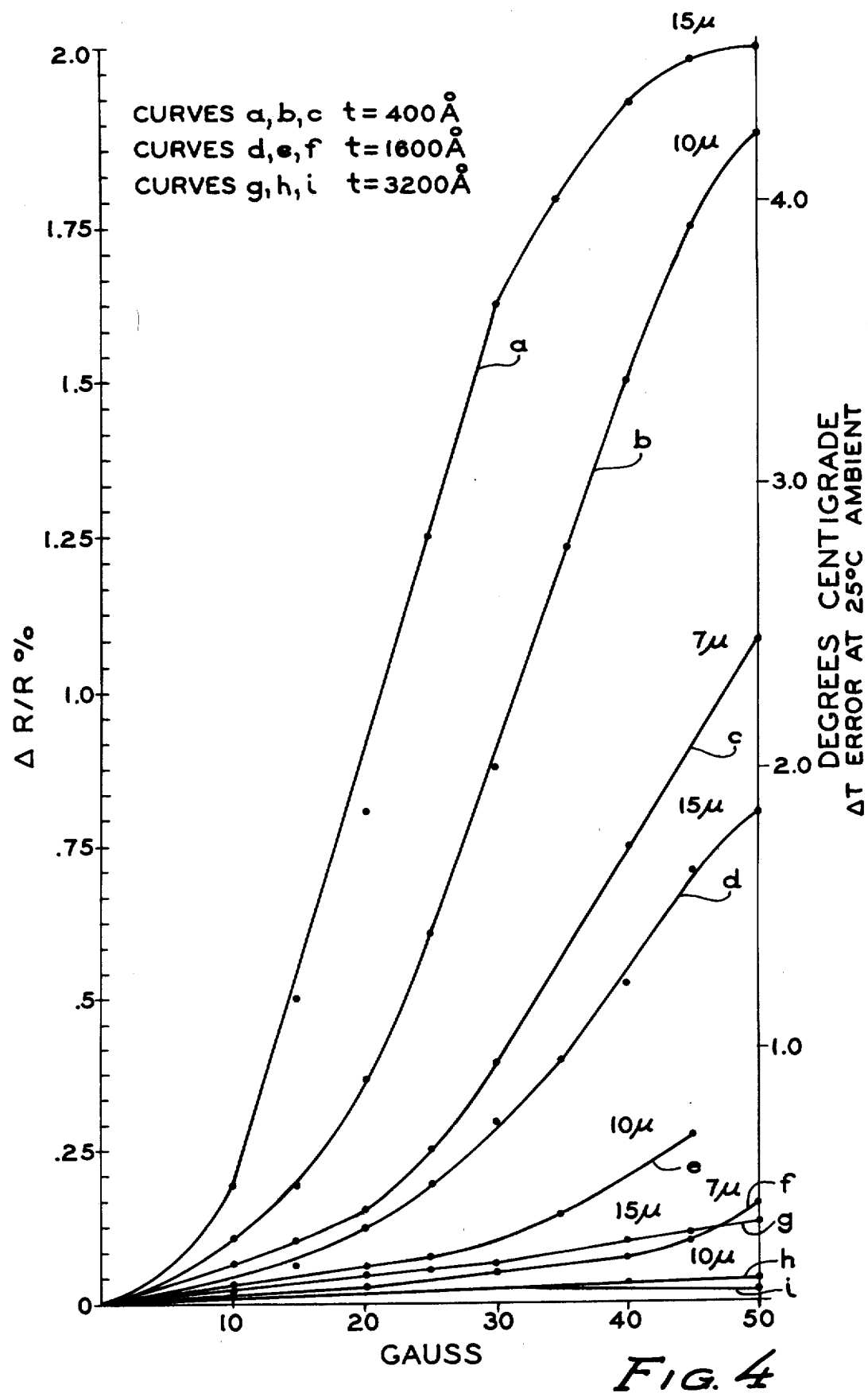
FIG. 4 shows a family of curves plotting ΔR/R% vs. magnetic field in gauss. The curves are of differing width (w) lines and differing deposition thickness (t).

We have found that a width (w) of 7-15 μm and a thickness of 400 to 3200 angstroms (A°) provide varying degrees of insensitivity to magnetic fields while remaining in a practical processing parameter range, although smaller (w) and larger (t) values could be used. In FIG. 4 there is a graphical presentation of change of resistance (ΔR/R) versus magnetic field in gauss. Curves, a, b and c are 15, 10 and 7 μm line widths, respectively, with a thickness (t) of 400 A°; curves d, e and f are 15, 10 and 7 μm line widths, respectively, with a thickness (t) of 1600 A°; and curves g, h and i are 15, 10 and 7 μm line widths, respectively, with a thickness (t) of 3200 A°. One preferred combination, laid out like FIG. 1, is w=7 μm and t=3200 A°. The spacing between the run lengths is also 7 μm but need not be so limited and may be wider apart if desired. The worst-orientation magnetic field response for this pair of w and t values is less than 0.02% change (ΔR/R) for a 50 gauss field strength as shown in FIG. 4. The corresponding temperature error is less than 0.05° C. at 50 gauss. If desired, half of the serpentine run of FIG. 1 can be arrayed perpendicular to the other half thus further reducing the magnetic effect. Although one preferred combination was identified, all of the combinations shown in FIG. 4 show great insensitivity to magnetic fields and all are suitable for use as temperature sensors.

Figure 5:
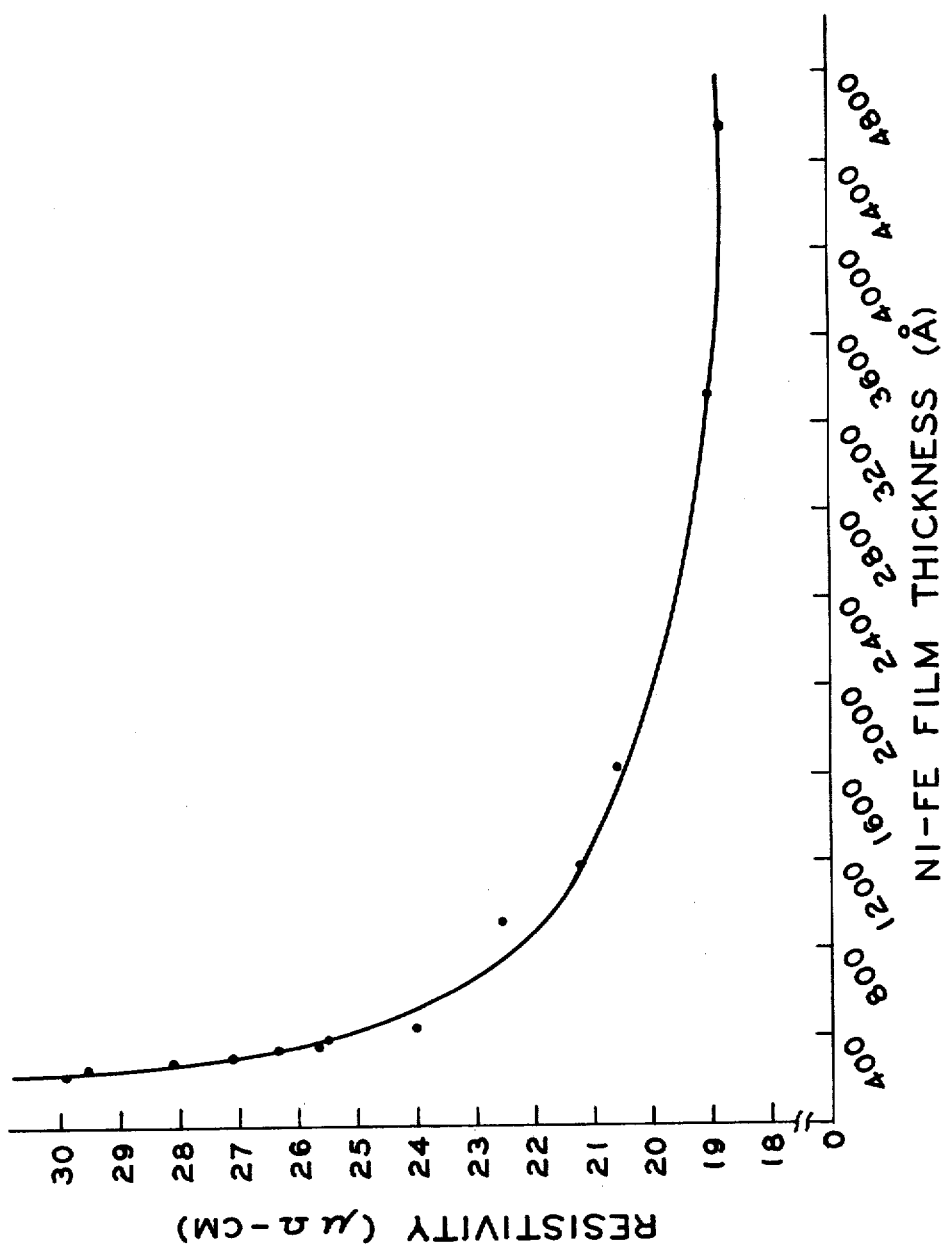
FIG. 5 is a plot of resistivity (μohm-cm) vs. Ni-Fe film thickness (angstroms).

Still narrower lines (e.g., down to about a micron) than the 7 μm lines prepared and tested are to be preferred as the state of the art advances so that the processing of narrower uniform lines becomes more dependable. The advantages are that the narrower the line run width, the more insensitive to magnetic effects it becomes. The limitations are that the difficulties in obtaining a specified resistance value in the element increases as the width is reduced because the uncertainties that effect the width cause a greater proportional variation in resistance. The tradeoffs involved in increasing thickness (t) and decreasing (w) to achieve the minimum magnetic field effect are: longer permalloy deposition times, and a lower resistivity with resulting larger area required on the silicon chip. FIG. 5 shows graphically the relation of resistivity (μohm-cm) to the thickness (in angstroms) of the Ni-Fe film. It can be seen that a thickness of around 400 A° is about the lower limit for use as a temperature sensor in that film surface scattering and grain boundary scattering effects are increasing rapidly as thickness goes below 400 A°. These non-temperature dependent contributions to resistivity decrease the realizable TCR of the element.

The embodiments of the invention in which an exclusive property or right is claimed are defined as follows:

1. A temperature sensing element comprising:
   an insulating substrate;
   an isolating layer on the surface of said substrate;
   a long narrow thin film resistive path of NiFe deposited on the surface of said isolating layer, said resistive path having a narrow width of less than about 15 μm and said resistive path having a thickness in excess of about 400 A°, said NiFe path having a desired temperature coefficient of resistance and by reason of said narrow width and said deposition thickness being relatively insensitive to magnetic field intensity; and,
   a passivating layer overlaying the resistive material.

2. The element according to claim 1 wherein said isolating layer is SiO.

3. The element according to claim 1 wherein said isolating layer is silicon nitride.

4. The element according to claim 1 wherein said NiFe path has a width of about 7 μm and a deposition thickness in the range from about 1600 A° to about 3200 A°.

5. The element according to claim 1 wherein the width is less than about 10 μm.

6. The element according to claim 1 wherein the width is less than about 7 μm.

7. The element according to claim 1 wherein the width is in the range of from about 7 μm to about 15 μm.

8. The element according to claim 1 wherein the resistive path thickness is in the range of about 400 A° to about 3200 A°.

9. The element according to claim 1 wherein the resistive path thickness is in excess of about 1600 A°.

10. The element according to claim 1 wherein said substrate is silicon.

11. The element according to claim 1 wherein said passivating layer is silicon nitride.

12. A temperature sensing element comprising:
    an insulating substrate; and,
    a long narrow thin-film resistive path of the NiFe deposited on the surface of a said substrate, said resistive path having a narrow width in the range of less than about 15 μm and said resistive path having a thickness in excess of about 400 A°, said NiFe path having a desired temperature coefficient of resistance and by reason of said narrow width and said deposition thickness being relatively insensitive to magnetic field intensity.

* * * * *